Patented Nov. 16, 1926.

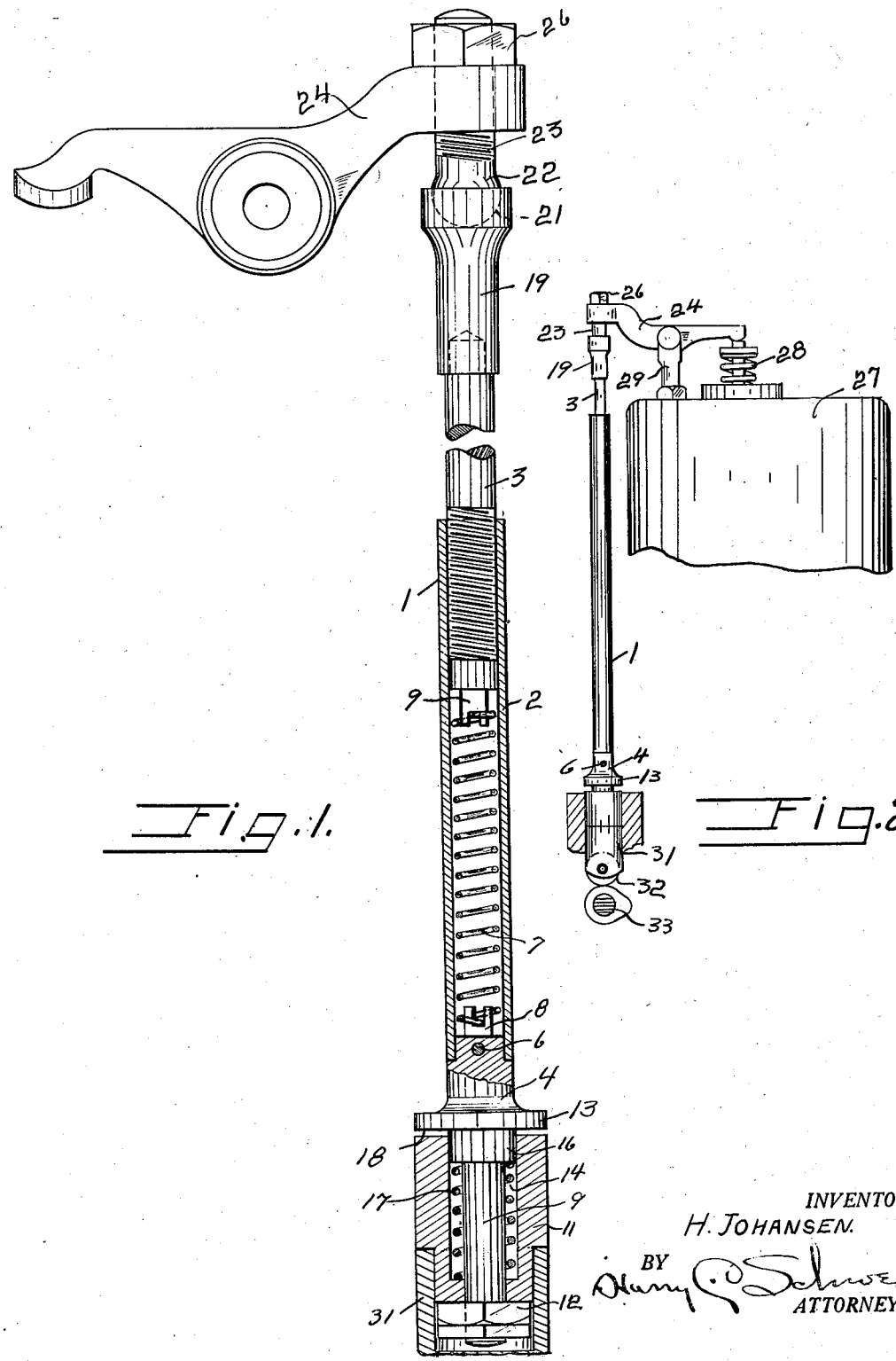

1,607,128

UNITED STATES PATENT OFFICE.

HENRY JOHANSEN, OF SAN FRANCISCO, CALIFORNIA.

PUSH ROD FOR INTERNAL-COMBUSTION ENGINES.

Application filed December 7, 1925. Serial No. 73,569.

The present invention relates to improvements in push rods for internal combustion engines, and its particular object is to provide a self-adjusting push rod that will expand longitudinally to compensate for wear and that is also capable of slight contraction to compensate for expansion of the motor or engine due to heat. It is particularly proposed in this connection to use torsionally active means for effecting expansion and longitudinally active spring means allowing of contraction. Further objects and advantages of my invention will appear as the specification proceeds.

The preferred form of the invention is illustrated in the accompanying drawing, in which Figure 1 shows a longitudinal section through my push rod.

Figure 2 shows my push rod in side elevation, attached to an internal combustion engine.

While I have shown only the preferred form of the invention, it should be understood that various changes or modifications may be made within the scope of the claim hereto attached without departing from the spirit of the invention.

My push rod 1 comprises a tubular member 2 adapted to threadedly receive a short rod 3 in one end thereof. A fitting 4 is fastened to the other end by means of a pin 6 and a spiral spring 7 is fastened with one end to a lug 8 projecting from the fitting 4 and with the other end to a lug 9 projecting from the rod 3. The thread on the rod is arranged in such a manner that when the rod is turned for inward motion, the spring is placed under tension and has a tendency to turn the rod in the opposite direction. The fitting 4 terminates in a shaft 9 on which a sleeve 11 is slidably mounted, outward motion of the sleeve being limited by a nut 12 threaded on the extreme end of the shaft, and inward motion of the sleeve being limited by a collar 13 on the fitting 4. The sleeve is recessed as shown at 14 to provide an annular chamber around the shaft and the inner end of the sleeve rides on a collar 16 extending outwardly from the collar 13 and being of smaller diameter than the latter. A spring 17 is interposed between the collar 16 and the extreme end of the sleeve, the spring being tensioned to force the sleeve outwardly so that normally a little space is left between the collar 13 and the sleeve 11 as shown at 18. The spring 17 is a very strong spring and only yields to considerable pressure, its function being to allow the push rod to slightly contract in its overall length by eliminating the space 18 to compensate for expansion of the motor block due to heat.

A fitting 19 in the upper end of the rod terminates in a socket 21 adapted to receive the ball 22 of a screw 23 threaded into a rocker arm 24 and to be locked into position by means of a nut 26.

The general situation is explained in Figure 2 in which is shown the upper portion of an engine block 27, intake valve 28, post 29 for the rocker arm 24, the push rod 1, a carrier 31 for the same, a roller 32 at its lower end and a cam shaft 33, imparting reciprocating motion to the push rod.

When the engine block becomes hot it slightly expands, and calls for a compensating contraction of the push rod 1 which is automatically effected due to the action of the spring 17 allowing the space 18 to be taken up. When the push rod 1 wears it automatically expands longitudinally due to the action of the spring 7, which has a turning effect on the rod 3, due to the fact that the spring has been initially placed under torsional tension, due to the act of screwing the rod 3 into the sleeve 2.

I claim:

A push rod of the character described comprising a sleeve formed with an internal flange at the bottom and with an external shoulder intermediate its length adapted to rest on a supporting element, a shaft slidable in the flange and formed with a collar adapted to rest on the top of the sleeve and with nuts threaded on the shaft below the flange for adjusting the active length of the shaft to slightly exceed that of the sleeve, a spring resting on the flange tending to force the shaft upward, a tube fixed relative to the shaft and forming an extension thereof, a rod threaded into the upper end of the tube, a spring in the tube tending to unthread the rod for extending the overall length of the entire device and a socket at the upper end of the rod.

In testimony whereof I affix my signature.

HENRY JOHANSEN.